United States Patent [19] [11] 4,338,667
Cook et al. [45] Jul. 6, 1982

[54] INITIALIZATION APPARATUS FOR A BRAKE CONTROL SYSTEM

[75] Inventors: Robert D. Cook, Valencia; Thomas Skarvada, Woodland Hills, both of Calif.

[73] Assignee: Crane Co., Chicago, Ill.

[21] Appl. No.: 132,112

[22] Filed: Mar. 20, 1980

[51] Int. Cl.³ .................. B60T 8/02; G06F 15/20
[52] U.S. Cl. .................. 364/426; 244/111; 303/109
[58] Field of Search .......... 364/426; 303/95, 109; 244/110 A, 111

[56] References Cited

U.S. PATENT DOCUMENTS 3,768,873 10/1973 Hirzel ........................... 303/109
4,007,970 2/1977 Romero ...................... 244/111 X
4,022,513 5/1977 Hirzel et al. ............... 303/109 X
4,180,223 12/1979 Amberg ........................ 244/111

Primary Examiner—Jerry Smith
Attorney, Agent, or Firm—Hume, Clement, Brinks, Willian & Olds, Ltd.

[57] ABSTRACT

An initialization apparatus for an antiskid brake control system including a modulator which generates a brake control signal as a time integral function of an error signal operates to initialize the modulator to a preselected value of the brake control signal when excessive braking action is sensed after a period of antiskid inactivity. The initialization apparatus also operates to initialize a reference signal in the direction of more aggressive braking and to bias the reference signal toward more aggressive braking for a selected time period following initialization of the modulator.

38 Claims, 5 Drawing Figures

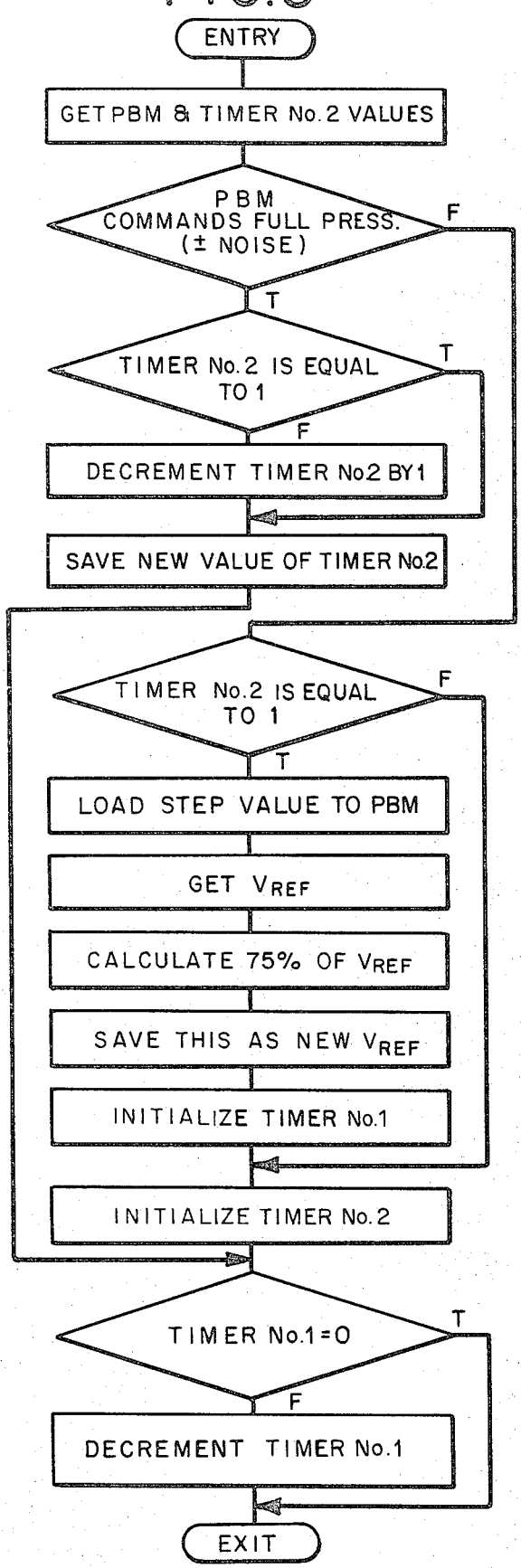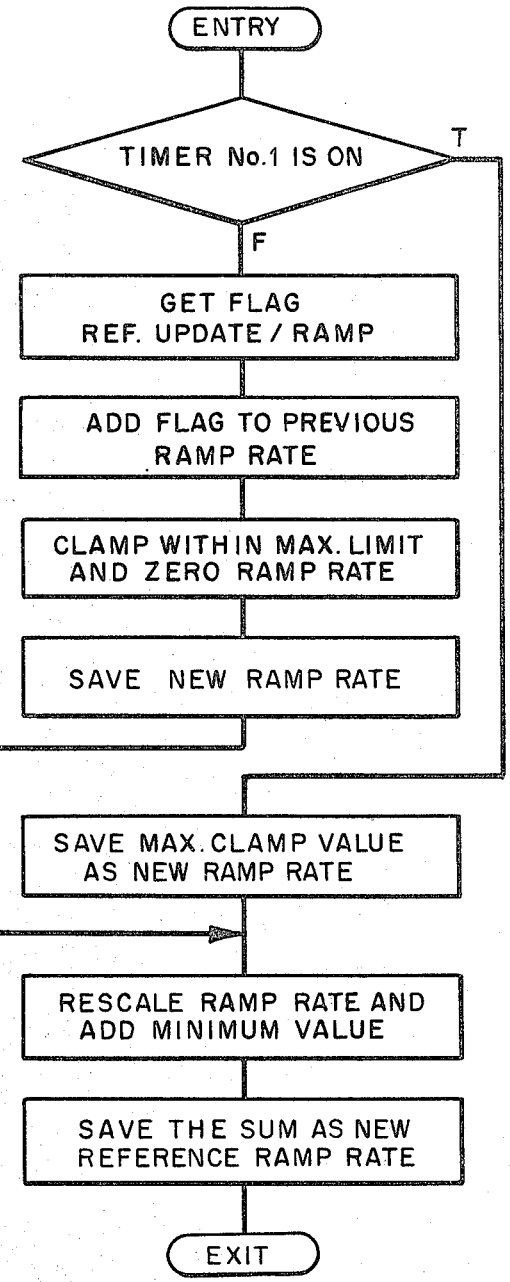
FIG. 3
FIG. 4b

INITIALIZATION APPARATUS FOR A BRAKE CONTROL SYSTEM

BACKGROUND OF THE INVENTION

The present invention is directed to an apparatus for initializing a brake control system. The apparatus of this invention is particularly useful in brake control systems such as antiskid systems.

One important class of modern brake control systems modulates braking action to achieve the desired level of braking. These systems include a modulator which generates a brake control signal as a time integral function of the difference between a reference value and a measured wheel characteristic, such as velocity or acceleration. The brake control signal is indicative of the desired modulated braking action.

For example, one type of such brake control system is an antiskid system which compares wheel velocity with a reference velocity to generate an error signal which is integrated over time. The integrated error signal is then used to generate a modulated brake control signal. This control signal is summed with other brake control signals and then used to control an antiskid value which acts to reduce braking action on command. Other modulating brake control systems integrate the difference between measured wheel acceleration and a reference acceleration in order to generate the modulated brake control signal.

Such modulator based brake control systems provide significant advantages, primarily in terms of smooth, efficient braking and skid control. Because of these advantages, such systems have found widespread application on modern commercial jet aircraft. U.S. Pat. No. 3,724,916, issued Apr. 3, 1973 to Edgar A. Hirzel, discloses an early example of such a modulating brake control system.

However, modulator based systems have in the past suffered from certain disadvantages related to efficient modulator initialization. Because the modulated brake control signal is a time integral function of the braked wheel's rotational behavior, it does not ordinarily change level abruptly. This can result in excessive braking action and skidding during the initial brake application. For example, many prior art braking control systems routinely use an initial skid at aircraft touchdown to generate a large error signal to initialize the modulator and the brake control system.

This approach in effect induces an initial skid, the depth and duration of which serves to initialize the modulator. Typically, between one and two skids are needed to raise the output of the modulator to the point where it begins to operate properly. During this initialization period, wheel skid generally passes beyond the desired level of slip to establish an error signal large enough to initialize the modulator. This in turn results in reduced braking effectiveness, increased tire wear, and undesirable tire heating during the initialization period. In addition to reduced braking effectiveness during the initialization period, elevated tire temperature caused by the initialization skids can reduce the maximum braking force available after skid recovery.

SUMMARY OF THE INVENTION

The present invention is directed to an improved apparatus for initializing a brake control modulator, which reduces the amount of skidding or wheel slip required for modulator initialization.

According to a first feature of this invention, means are provided for modifying the modulated brake control signal when a signal indicative of excessive wheel slip or skidding crosses a threshold value after remaining within a specified range of values for a selected time period. Preferably, the modifying means acts to rapidly adjust the brake control signal to a level suitable for maximum braking effectiveness for a dry runway surface.

This feature operates to quickly initialize the modulator to a point where it can begin to modulate properly. Only a limited amount of wheel slip is required to trigger the initialization, and initialization is therefore faster than in the prior art systems described above. This reduces the depth and duration of the initial wheel skids and therefore improves braking effectiveness.

According to a second feature of this invention, means are provided for initializing a reference signal by modifying it in the direction of more aggressive braking at substantially the same time as the modulator is initialized. Initialization of the reference signal permits the brake control system to adapt quickly to the optimum degree of wheel slip.

A third feature of the invention also relates to improved adaptability of the brake control system. During an aircraft landing, the maximum available braking force typically rises rapidly as the aircraft settles, the spoilers are deployed, and more and more weight is supported by the wheels. During this initial period of rising available braking force, it has been found advantageous to operate the braking system in an aggressive braking mode in which the modulator re-applies the brakes more quickly and forcefully after they have been relaxed due to excessive wheel slip.

This permits the braking system to quickly detect and take advantage of the increased available braking force. The braking system is not allowed to stabilize during the abnormally reduced braking effectiveness found immediately after touchdown. Instead, the adaptability of the brake control is kept high for an initial period.

Preferably, this third feature of the invention includes means for biasing the reference signal toward more aggressive braking during an initial period which begins at substantially the same time as modulator initialization. For example, in velocity based brake control systems, the reference velocity is preferably made to decrease at a faster than usual rate for a short period of time following initialization of the modulator.

The invention, together with further objects and attendant advantages, will be best understood by reference to the following detailed description taken in connection with the accompanying drawings.

BRIEF DESCRIPTION OF THE DRAWINGS

FIG. 3 is a flow chart of the initialization portion of the antiskid control system of FIG. 2.

FIGS. 4a and 4b are flow charts of the reference velocity determination portion of the antiskid control system of FIG. 2.

DETAILED DESCRIPTION OF A PREFERRED EMBODIMENT

Figure 1:
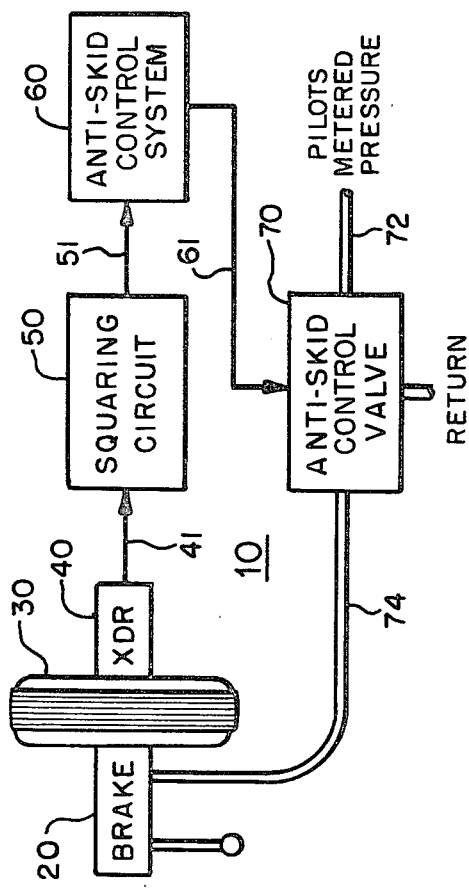
FIG. 1 is a schematic representation of a brake control system including an antiskid control system.

Referring now to the drawings, a preferred embodiment of the initialization apparatus of the present invention will be described in connection with the brake control system shown in FIGS. 1 and 2. FIG. 1 shows the major components of an antiskid brake control system 10 which provides brake control for the brake 20 of a rotatable wheel 30. The system 10 includes a wheel-speed transducer 40 which produces a sinusoidal signal on line 41 having a frequency proportional to the angular velocity of the wheel 30. The signal on line 41 is shaped in a squaring circuit 50 and is then supplied as a wheel speed signal to an antiskid control system 60 via line 51. The antiskid control system 60 monitors the wheel signal on line 51. When the wheel signal indicates that the wheel 30 is about to go into a skid due to excessive braking force, the antiskid system 60 generates a brake control signal on line 61. The antiskid control valve 70 is positioned in the brake line 72 which supplies brake fluid under pressure to the brake 20, and the valve 70 operates in response to the signal on line 61 to reduce the brake pressure applied to the brake 20.

In this preferred embodiment, the brake pressure in line 72 is the metered pressure determined by the vehicle operator by means of conventional hydraulic controls. As long as the wheel 30 is not braked so severely as to go into a skid, the full metered pressure in the line 72 is passed by the valve 70 via the line 74 to the brake 20. However, if the metered brake pressure exceeds the skid threshold and drives the wheel 30 into a skid, the antiskid system 60 will generate a brake control signal on line 61 which causes the valve 70 to reduce the pressure in the line 74 to a value less than the metered pressure. By reducing the pressure applied to the brake 30, the braking torque is reduced and the wheel 30 is prevented from skidding.

Figure 2:
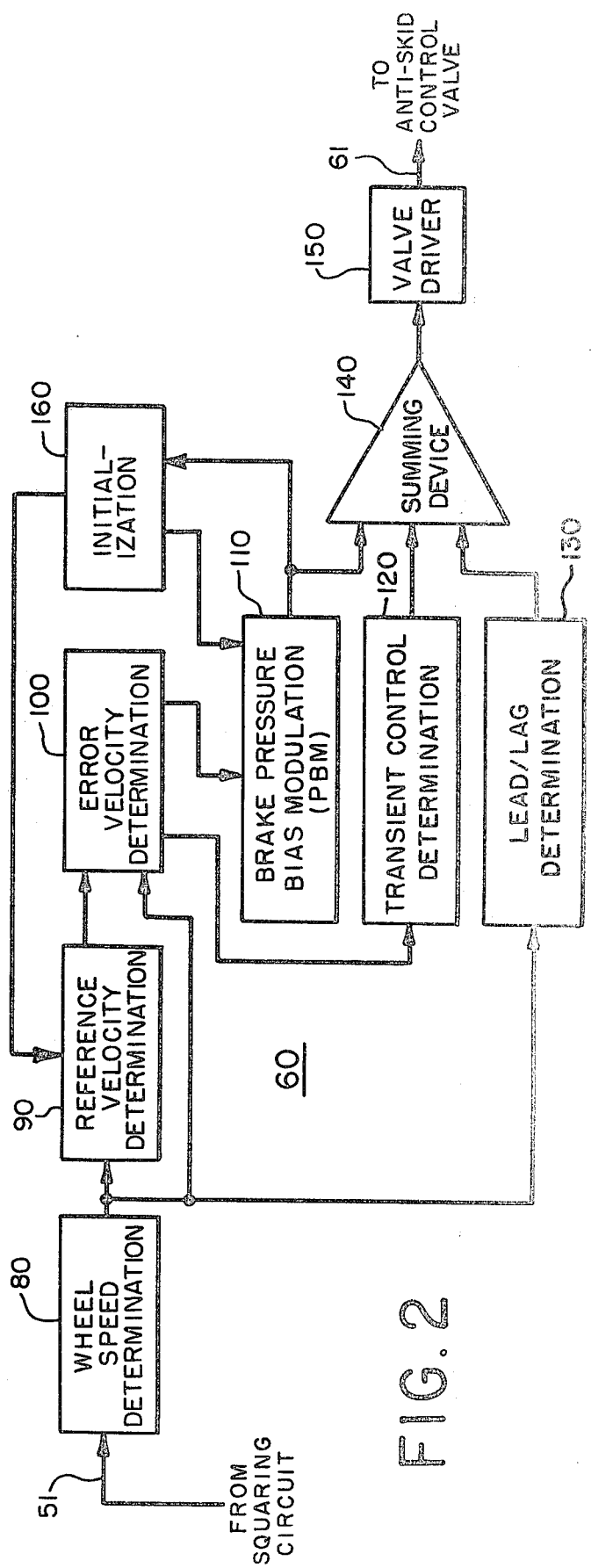
FIG. 2 is a schematic representation of the functional components of the antiskid control system of FIG. 1.

FIG. 2 shows a schematic representation of the antiskid system 60 of FIG. 1, including a wheel speed determination unit 80 which uses the wheel signal on line 51 as an input and generates an output signal representative of measured wheel speed. This wheel speed signal is supplied as an input to a reference velocity determination unit 90 for generating a reference velocity signal representative of the desired wheel speed for optimum braking. This reference velocity signal is applied as an input to an apparatus 100 for determining an error velocity signal representative of the difference between the measured wheel speed signal and the reference velocity signal. The error velocity signal is applied as an input to two separate control units: the brake pressure bias modulation unit, or modulator 110, and the transient control determination unit 120.

The modulator 110 integrates the error velocity signal over time to arrive at a time averaged, modulated signal representative of the optimum braking pressure. This signal is smoothly and continuously modulated to either increase or decrease the applied brake pressure as needed to substantially prevent excessive wheel skidding while maintaining a high, effective level of braking.

Because the output of the modulator 110 is a time integral function of the error velocity signal, it will on occasion be unable to respond quickly enough to prevent a wheel skid. For example, when a braked wheel suddenly enters a tar strip or an ice patch or a wet surface, the skid threshold will abruptly fall and the wheel may enter a deep skid if heavily braked. Under these conditions, the transient control unit 120 responds to a large error velocity signal by commanding a sharp and sudden reduction in applied brake pressure.

The wheel speed signal is also applied as an input to a lead/lag unit 130 which responds to changes in the wheel speed signal to anticipate trends and to command an early modification in brake pressure to anticipate skids.

Outputs from the modulator 110, the transient control unit 120, and the lead/lag unit 130 are summed in a summing device 140 to produce a composite brake control signal which is amplified by the valve driver 150 and then applied as a control signal via line 61 to the antiskid control valve.

The foregoing description of the brake control system 10 is provided to set forth the environment of a preferred embodiment of the initialization apparatus of this invention. Individual components of this environment do not form a part of the present invention, and for that reason have not been described in detail here. Furthermore, those skilled in the art are familiar with various forms of these components. For example, one form of the wheel speed determination unit 80, the error velocity determination unit 100, the modulator 110, the transient control unit 120, and the lead/lag unit 130 is shown in U.S. Pat. No. 3,724,916, issued Apr. 3, 1973 to Edgar A. Hirzel, and entitled "Controlled Wheel Braking System". Other forms of the wheel speed determination unit 80 are described in U.S. Pat. No. 4,056,287, issued Nov. 1, 1977 to Wolfgang Gudat; and in U.S. Pat. No. 4,125,295, issued Nov. 14, 1978 to Gerhard Ruhnam, et al.

The present invention is directed to an improved initialization apparatus for a brake control system. A presently preferred embodiment of this invention, included in initialization unit 160 of FIG. 2, will be described in conjunction with the flow charts of FIG. 3.

The presently preferred embodiment of the present invention is implemented as a programmed microprocessor. The presently preferred microprocessor is a Z-80 CPU manufactured by Zilog, Inc., Cupertino, Calif. The program is presented in flow chart form in FIG. 3 and is listed in assembly language form in Table 1.

This program monitors the control signal output of the modulator 110 to determine the appropriate time to initialize the modulator 110 and the reference velocity determination unit 90, and then accomplishes the initialization by introducing a step function modification to the output of the modulator circuit 110 and the reference velocity signal at the appropriate time.

Turning now to FIG. 3, the presently preferred embodiment of the invention maintains a timer (Timer #2 in FIG. 3) which is used to determine when the modulator unit 110 has been commanding substantially no pressure reduction by the antiskid valve for more than a pre-determined time interval. The program of FIG. 3 is in this embodiment executed about 203 times per second. At each pass through the program the output signal (PBM) of the modulator 110 is sampled and compared with a threshold value (LOWPBM). This threshold value is set equal to a low modulator output which corresponds to substantially no reduction in brake pressure applied to the brake 20, with a small allowance for noise. In this embodiment, the threshold value is set to correspond to a antiskid valve current of about one milliamp.

Depending on the outcome of the comparison between the modulator output and the threshold, the program branches. If the modulator output is below the threshold, corresponding to a valve current less than 1 milliamp, TIMER #2 is decremented by 1 if it is greater than 1 or left unchanged if it is equal to 1. The minimum value of TIMER #2 is 1, and when TIMER #2 is equal to 1 it indicates that the antiskid valve current commanded by the modulator 110 has been substantially zero for a period greater than the time required for TIMER #2 to time out. An additional timer (TIMER #1) is decremented by 1 in this branch of the program if greater than zero.

If the modulator output is above the threshold LOWPBM the program enters a second branch in which TIMER #2 is examined to see if it has timed out, indicating that the modulator output is now above the threshold value after an extended period of time below the threshold. If it has, this is taken as an indication that the modulator output and the reference velocity are to be initialized. To accomplish this, the modulator output is set equal to a selected value (PBMSTP) and the reference velocity is set equal to 75% of its previous value. TIMER #2 and TIMER #1 are both then initialized, and TIMER #1 is decremented by 1 if greater than zero.

In this preferred embodiment, the initialization value for TIMER #2 is 74 hexadecimal, which equals 116 decimal and corresponds to a timer interval of 0.57 seconds. Thus, this embodiment operates to initialize both the modulator output and the reference velocity every time the modulator output exceeds the threshold value after remaining below that threshold for 0.57 seconds or more. In operation, this will happen during the initial skid of an aircraft touchdown, and then again whenever a wheel enters a skid after a period of antiskid inactivity.

Preferably, the initialization value PBMSTP for the modulator output signal is set at a value appropriate for skid control on a dry runway under normal circumstances. This is particularly true for modulators of the type which act to reduce brake pressure more quickly than to increase brake pressure. In practice, the initialization value is set empirically to minimize stopping distance for the desired conditions. Preferably, the antiskid valve 70 is a single gain valve of the type described in U.S. Pat. No. 4,130,322, for in this case brake pressure is a function of only the control signal on line 61, as long as the metered pressure on line 72 exceeds the pressure commanded by the control signal. When such an antiskid valve 70 is used the initialization value actually corresponds to an initialization brake pressure, assuming the pilot has commanded adequate pressure.

In addition, the preferred embodiment of FIG. 3 controls TIMER #1 which affects the manner in which the reference velocity is determined. As shown in FIG. 3, TIMER #1 is initialized whenever the modulator output and reference velocity are initialized, and TIMER #1 is decremented each time the program of FIG. 3 is executed. In this preferred embodiment, TIMER #1 is initialized to 77 hexadecimal, or 119 decimal. Approximately 0.58 second therefore elapses between the time TIMER #1 is initialized and the time TIMER #1 is next decremented to zero.

Figure 4A:
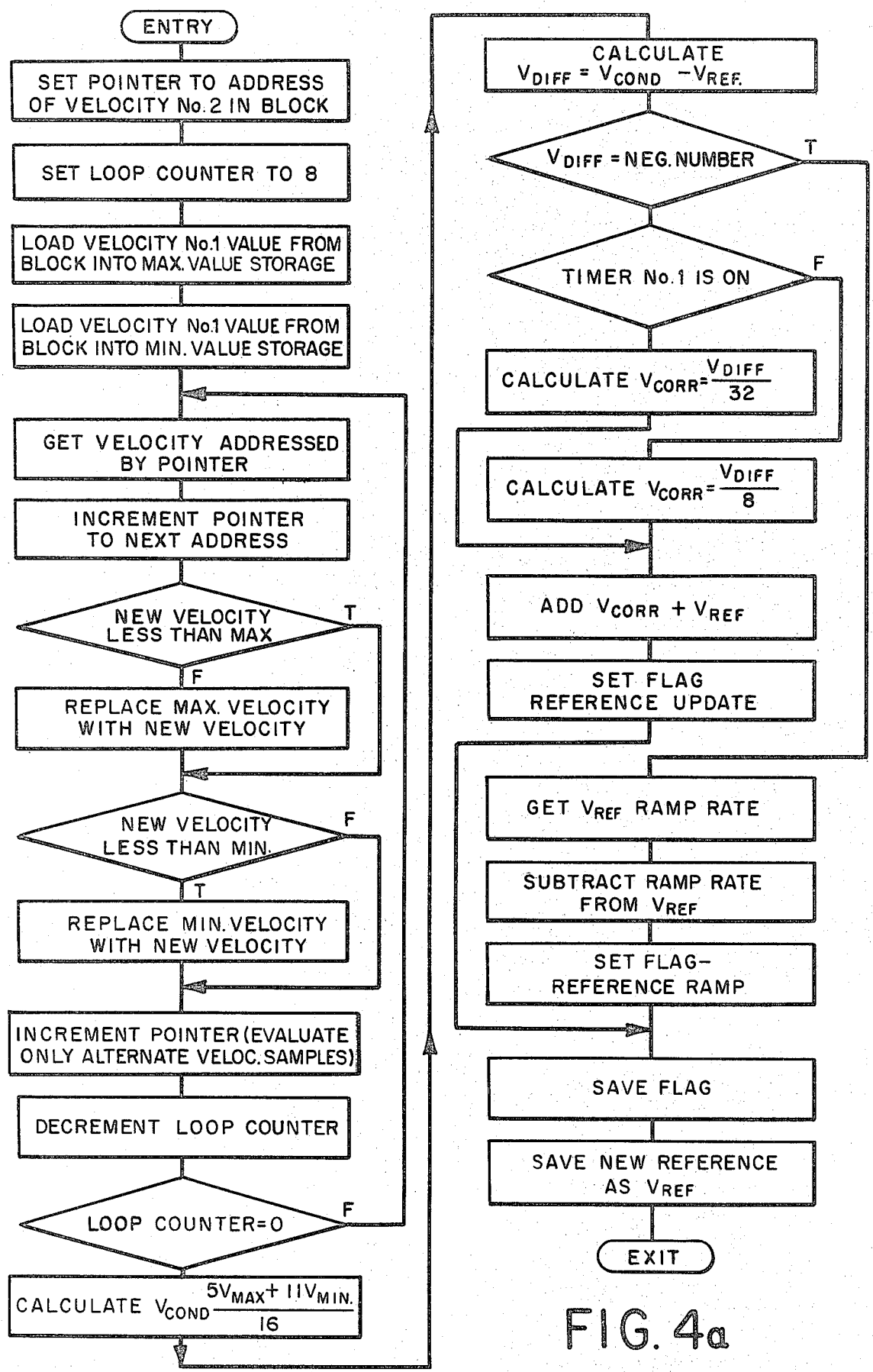

During the time when TIMER #1 is not equal to zero, the Reference Velocity Determination Unit 90 of FIG. 2 operates to bias the reference velocity more strongly towards lower values. FIGS. 4a and 4b provide a flow chart of the operation of the Reference Velocity Determination Unit 90. Tables II and III list the programs of FIGS. 4a and 4b in assembly language.

Referring to FIG. 4a, this program first calculates a conditioned velocity signal ($V_{COND}$), which is approximately equal to the current average velocity signal from the braked wheel with some allowance for oscillations in the velocity signal. The conditioned velocity signal is then compared with the reference velocity, which is revised depending on the outcome of the comparison.

If the conditioned velocity signal is greater than the reference velocity, then the reference velocity is increased, or updated, by an amount proportional to the difference between the two. The proportionality factor is one-thirtysecond when TIMER #1 is not equal to zero and one-eighth otherwise. The reference velocity is biased towards lower velocities during the initialization period when TIMER #1 is non-zero, because the reference velocity is increased by a smaller fraction of the difference during this period.

On the other hand, if the conditioned velocity is less than the reference velocity, the reference velocity is reduced, or ramped, by a predetermined amount, the ramp rate, which is calculated by the program of FIG. 4b. As shown in FIG. 4b, the calculation of the ramp rate is dependent on TIMER #1. During the initialization period, when TIMER #1 is non-zero, the ramp rate is set to a maximum value, which in this embodiment corresponds to 0.053 feet per 0.005 second. At other times it is calculated by adding an amount to the previous ramp rate, which amount varies according to whether the reference velocity was increased or decreased during the last execution of the program of FIG. 4a. In the program of FIGS. 4a and 4b the ramp rate is decreased by about 0.0008 feet per second each time the reference velocity is greater than the conditioned velocity and the ramp rate is increased by about 0.0001 feet per second each time the reference velocity is less than the conditioned velocity.

The details of how the ramp rate is set when TIMER #1 is equal to zero and how the conditioned velocity signal is calculated do not in themselves form part of the present invention. These details, which are set forth in detail in commonly assigned U.S. patent application Ser. No. 06/060,573, are presented here merely to elucidate the environment of the invention as it relates to determination of a reference signal such as a reference velocity during an initialization period.

Because TIMER #1 is non-zero for a period of about 0.58 seconds following initialization of the modulator, it is during this period that the reference velocity is biased towards lower velocities. This results in more aggressive application of brake pressure during the initialization period than at other times. Thus, as the airplane settles on its wheels after the initial touchdown, the antiskid system rapidly adapts to the increased available braking face by aggressively commanding a lesser reduction in brake pressure than at other times.

The programs of FIGS. 3, 4a and 4b are listed in assembly language in Tables 1, 2a, 2b and 2c. Table 1 corresponds to the program of FIG. 3; Table 2a corresponds to the program of FIG. 4a; Table 2b corresponds to the program of FIG. 4b and Table 2c provides a listing of the constants and variables used by the programs of Tables 2a and 2b. In order to better understand these listings, it should be understood that the wheel speed measurements stored in the velocity block as VELOC1 through VELOC16 are stored as sixteen-bit binary numbers scaled to 0.1 foot per second per LS bit. The reference velocity $V_{REF}$ corresponds to the variable REFER which is a twenty-four-bit binary number scaled to about 0.000391 foot per second per bit, and the ramp rate corresponds to RAMP and is scaled identically to REFER. Preferably the programs of Tables 1, 2a and 2b are each executed after each wheel speed measurement is made, about once every 5 milliseconds in this embodiment.

Each of the foregoing aspects of the invention contributes to improved initialization of a modulating antiskid system. Modulator initialization rapidly brings the modulator to a point where it can begin to modulate brake pressure effectively. Initialization of the reference signal rapidly brings the reference signal to a point where the antiskid is aggressively controlling the brakes, and biases the reference signal in the direction of aggressive braking for an initial period. These advantages are obtained while reducing the severity and duration of the initial wheel skid, thereby minimizing the tire heating and reduction in braking efficiency associated with such skids. Improved braking efficiency is particularly important at high vehicle speed, because a skid at high speed generally results in a greater increase in total stopping distance than does a skid at low speed. The present invention reduces the depth and duration of initial touchdown skids, and therefore contributes to high braking efficiency and reduces the overall braking distance.

This embodiment of the invention monitors the output signal of the modulator to determine when to initialize the anti-skid system. Alternate embodiments monitor other signals indicative of excessive braking action. For example, the error signal integrated by the modulator, i.e., the difference between the wheel signal and the reference signal, can also be monitored as an indication that a wheel is entering a skid after a period of no skidding and thus that it is appropriate to initialize.

Of course, it should be understood that various changes and modifications to the embodiment described above will be apparent to those skilled in the art. For example, the invention can be used with acceleration based antiskid systems as well as velocity based antiskid systems. In addition, details of operation such as the timing intervals of the timers and the threshold values may be altered to fit individual applications. Moreover, the invention may be embodied in analog as well as digital form. Such changes and modifications can be made without departing from the spirit and scope of the present invention, and without diminishing its advantages. Such changes and modifications are, therefore, intended to be covered by the following claims.

TABLE 1

```
;
;           INITIALIZATION
;           **************
;
    HOUSEX  LD DE,(PBM); GET PBM
            LD HL,LOWPBM; THRESHOLD FOR STEP
            XOR A
            SBC HL,DE
            LD A,(TIMER); GET TIME COUNTER
            JR NC,HOUSEA
            DEC A
            JR NZ,HOUSEB
            INC A
    HOUSEB  LD (TIMER),A; SAVE NEW VALUE
            JR HOUSEE
;
    HOUSEA  CP 1
            JR NZ,HOUSEC
            LD HL,PBMSTP; LOAD PBM STEP VALUE
            LD (PBM),HL
            LD HL,(REFER+1)
            LD D,H
            LD E,L
            SRL D
            RR E
            SRL D
            RR E
            XOR A
            SBC HL,DE
            JR NC,HOUSED
            LD HL,0
    HOUSED  LD (REFER+1),HL
            LD (IY+FORTIM-RAM),FORCE
    HOUSEC  LD (IY+TIMER-RAM),74H; COUNT FOR .58 SECOND
```

Table 1 -Continued

```
HOUSEE    LD A,(FORTIM)
          CP 0
          JR Z,HOUSEF
          DEC (IY+FORTIM-RAM)
HOUSEF    RET
;
;
PBM       EQU 80AH; MODULATOR OUTPUT (TWO BYTES)
LOWPBM    EQU 7DAAH; MODULATOR THRESHOLD
TIMER     EQU 80DH; TIMER #2 FOR MODULATOR INITIALIZATION
PBMSTP    EQU 22ECH; MODULATOR STEP
REFER     EQU 807H; REFERENCE VELOCITY (3 BYTES)
RAM       EQU 800H; BEGINNING OF RAM
FORTIM    EQU 811H; TIMER #1
FORCE     EQU 0FFH; INITIALIZATION VALUE FOR TIMER #1
```

TABLE 2a

```
;
;         REFERENCE VELOCITY DETERMINATION
;         ********************************
;
REFX      LD HL,VELOC2
          LD B,7 ; LOOP COUNT
          EXX
          LD DE,(VELOC1)
          LD B,D
          LD C,E
          EXX
;
REFA      LD A,(HL) ; SET LOW BYTE
          EX AF,AF
          INC HL
          LD A,(HL) ; SET HIGH BYTE
          INC HL
          EXX
          LD H,A
          EX AF,AF
          LD L,A ; MOVE VELOCITY TO HL
          CP A
          SBC HL,DE ; COMPARE WITH MAX
          JR NC,REFB
          ADD HL,DE ; RECOVER NEW VELOCITY
          JR REFC
REFB      ADD HL,DE ; RECOVER NEW VELOCITY
          LD D,H
          LD E,L
REFC      CP A
          SBC HL,BC ; COMPARE WITH MIN VELOCITY
          JR NC,REFD
          LD C,A
          EX AF,AF
          LD B,A ;   SAVE NEW AS MIN
REFD      EXX
          INC HL ;   SKIP EVERY OTHER VELOCITY IN BLOCK
          INC HL
          DJNZ REFA ; LOOP FOR WHOLE VELOCITY BLOCK
```

Table 2a -Continued

```
;
            EXX
            LD H,D
            LD L,E ; MOVE MAX VELOCITY
            XOR A
            SBC HL,BC ; GET DIFFERENCE
            EX DE,HL
            ADD HL,BC
            SRL D
            RR E ; DIVIDE BY 2
            XOR A
            SBC HL,DE
            SRL D
            RR E
            ADD HL,DE
            SRL D
            RR E
            XOR A
            SBC HL,DE
            SRL H
            RR L
            LD DE,(REFER+1)
            XOR A
            SBC HL,DE
            JR C,REFE
;
;           REFERENCE UPDATE
;
            LD C,L
            LD L,H
            LD H,O
            LD A,(FORTIM); GET TIMER VALUE
            CP O
            JR NZ,REFK
            JR REFF;        FINE TUNE ADDRESS DURING TESTING
            SLA C
            ADC HL,HL
            SLA C
            ADC HL,HL
REFF        SLA C
            ADC HL,HL
            SLA C
            ADC HL,HL
REFK        SLA C
            ADC HL,HL
            SLA C
            ADC HL,HL
            SLA C
            ADC HL,HL
            LD A,(REFER)
            ADD A,C
            ADC HL,DE
            LD (REFER+1),HL;    UPDATE REFERENCE
            LD (REFER),A
            LD DE,RTDOWN
            JR REFG
;
;           REFERENCE RAMP
;
REFE        EX DE,HL ; MOVE REFERENCE TO HL
            LD A,(RAMP)
```

Table 2a -Continued

```
            LD C,A
            LD A,(REFER);      GET SCALER
            LD DE,0
            SUB C
            SBC HL,DE;         SUBTRACT CARRY IF ANY
            JR C,REFH
            SUB C
            SBC HL,DE
            JR NC,REFI
REFH        LD HL,0
REFI        LD (REFER),A; SAVE NEW SCALER
            LD (REFER+1),HL; SAVE NEW REFERENCE
            LD DE,RTUP
;
REFG        LD (SCORE),DE
;
            LD DE,MAXREF; REFERENCE LIMIT (ANY SPEED ABOVE
;                         THIS CONSTITUTES A FAILURE)
            EX DE,HL
            XOR A
            SBC HL,DE
            JR NC,REFJ; JUMP, REFERENCE WITHIN RANGE
            LD DE,MAXREF;     OTHERWISE CLAMP REFERENCE
            LD (REFER+1),DE
REFJ        RET;       RETURN
```

TABLE 2b

```
;           REFERENCE RAMP RATE DETERMINATION
;           **********************************
;
AVDECX      LD A,(FORTIM)
            CP 0
            JR NZ,AVDECC
            LD DE,(SCORE)
            LD HL,(DECEL)
            ADD HL,DE
            LD (DECEL),HL
            EX DE,HL
            BIT 7,D
            JR Z,AVDECB
            LD DE,0
            JR AVDECA
AVDECB      LD HL,MAXDEC*256
            XOR A
            SBC HL,DE
            JR NC,AVDECA
AVDECC      LD DE,MAXDEC*256
AVDECA      LD (DECEL),DE
            LD A,D
            ADD A,MINDEC
            LD (RAMP),A
            RET;       RETURN
```

TABLE 2c

```
;
;             * * * * * *
;             *         *
;             *  RAM    *
;             *         *
;             * * * * * *
;
DECEL      EQU  80EH;   REF RAMP RATE (TWO BYTES)
ERROR      EQU  815H;   ERROR VALUE FOR CONTROL (TWO BYTES)
FORTIM     EQU  811H;   TIMER FOR SLOW REFER. UPDATE
RAMP       EQU  810H;   TIME CONSTANT FOR REFERENCE RATE
REFER      EQU  807H;   REFERENCE (THREE BYTES)
SCORE      EQU  81BH;   TEMP STORAGE FOR REFER RATE GENERATION
VELOC1     EQU  820H;   NEW VELOCITY
VELOC2     EQU  822H;   PREVIOUS VELOCITY  (ONE LOOP TIME BACK)
VELOC3     EQU  824H;          "       "   (TWO LOOP TIMES BACK)
VELOC4     EQU  826H;          "       "   (THREE LOOP TIMES BACK)
VELOC5     EQU  828H;          "       "   (FOUR LOOP TIMES BACK)
VELOC6     EQU  82AH;          "       "   (FIVE LOOP TIMES BACK)
VELOC7     EQU  82CH;          "       "   (SIX LOOP TIMES BACK)
VELOC8     EQU  82EH;          "       "   (SEVEN LOOP TIMES BACK)
VELOC9     EQU  830H;          "       "   (EIGHT LOOP TIMES BACK)
VELOC10    EQU  832H;          "       "   (NINE LOOP TIMES BACK)
VELOC11    EQU  834H;          "       "   (TEN LOOP TIMES BACK)
VELOC12    EQU  836H;          "       "   (ELEVEN LOOP TIMES BACK)
VELOC13    EQU  838H;          "       "   (TWELVE LOOP TIMES BACK)
VELOC14    EQU  83AH;          "       "   (THIRTEEN LOOP TIMES BACK
VELOC15    EQU  83CH;          "       "   (FOURTEEN LOOP TIMES BACK
VELOC16    EQU  83EH;          "       "   (FIFTEEN LOOP TIMES BACK)
;
;
;             * * * * * * * * * * * * * * * *
;             *                             *
;             *    GENERAL  CONSTANTS       *
;             *.                            *
;             * * * * * * * * * * * * * * * *
;
MAXREF     EQU  0DACH;  CLAMP FOR MAX REFERENCE VALUE (350 FT/SEC)
MINDEC     EQU  24;     MINIMUM DECEL
MAXDEC     EQU  70H;    MAXIMUM DECEL
RTUP       EQU  40H
RTDOWN     EQU  -200H
```

I claim:

1. In a vehicle antiskid brake control system for controlling the braking action on a braked wheel during a braking period to slow the vehicle from a higher speed to a lower speed; said system including modulator means for generating a modulated brake control signal; and valve means, responsive to the brake control signal, for controlling the braking of said braked wheel; the improvement comprising:

means for initializing said modulator means by modifying said brake control signal to reduce braking action on said braked wheel, said initializing means operative only during an initial reduction in braking action by said valve means after a selected time period of substantially no reduction in braking action by said valve means, said selected time period being shorter in duration than the braking period such that the initializing means may operate repeatedly during the braking period to initialize said modulator means.

2. The improvement of claim 1 wherein said initializing means includes means for abruptly altering said brake control signal, in the direction of increased reduction in braking action by said valve means, to initialize said modulator means.

3. The improvement of claim 1 wherein said initializing means includes means for setting said brake control signal to a preselected value, corresponding to increased reduction in braking action by said valve means, to modify said brake control signal.

4. In an aircraft brake control system for controlling the braking action in a braked wheel during a braking period which begins after aircraft touchdown and continues until the aircraft has reached a lower speed; said system including means for providing an input signal indicative of a braking condition of said wheel; modulator means, responsive to said input signal, for generating a brake control signal as a time integral function of said input signal; and valve means, responsive to said brake control signal, for modifying the braking of said braked wheel; the improvement comprising:

means for initializing said modulator means to reduce the braking action on said braked wheel when a signal indicative of excessive braking action crosses a threshold value after remaining within a selected range of values for a selected time period, said selected time period being shorter in duration than the braking period such that the initializing means may operate repeatedly during the braking period to initialize said modulator means;

said initializing means comprising means for setting said brake control signal to a pre-selected value corresponding to a selected reduction in braking action by said valve means to initialize said modulator means.

5. The improvement of claim 4 wherein said signal indicative of excessive braking action is the brake control signal.

6. In a vehicle antiskid brake control system for controlling the braking action on a braked wheel during a braking period which begins after aircraft touchdown and continues until the aircraft has reached a lower speed; said system including means for providing an input signal indicative of a braking condition of said wheel; modulator means, responsive to said input signal, for generating a brake control signal as a time integral function of said input signal; said valve means, responsive to said brake control signal, for controlling the braking action applied to said wheel; the improvement comprising:

timer means for generating a timing signal after an analog signal indicative of excessive braking action has remained for a selected time period within a selected range of values corresponding to an absence of excessive braking action; and means, responsive to said timing signal and said analog signal, for modifying said brake control signal to reduce the braking action applied to said braked wheel and thereby initialize said modulator means when said analog signal crosses a threshold value after remaining within said selected range of values for said selected time period; said selected time period being substantially shorter in duration than the braking period such that the modifying means may operate repeatedly during the braking period to initialize the modulator means.

7. The improvement of claim 6 wherein said analog signal indicative of excessive braking action is the brake control signal and the selected range of values corresponds to substantially no reduction of braking action by the valve means.

8. The improvement of claim 6 wherein said modifying means includes means for abruptly altering said brake control signal in the direction of increased reduction of braking action by said valve means to initialize said modulator means.

9. The improvement of claim 6 wherein said modifying means includes means for setting said brake control signal to a pre-selected value to initialize said modulator means.

10. In an aircraft antiskid brake control system for controlling the braking action on a braked wheel during a braking period which begins after aircraft touchdown and continues until the aircraft has reached a lower speed; said system including means for generating a wheel signal indicative of the rotation of said wheel; means for generating a reference signal; means for generating an input signal indicative of the discrepancy between the wheel signal and the reference signal; modulator means for generating a brake control signal as a time integral function of said input signal; and valve means, responsive to said brake control signal, for reducing the braking action applied to said wheel; the improvement comprising:

timer means for generating a first timer signal when an analog signal indicative of excessive braking action has remained for a selected time period within a selected range of values corresponding to an absence of excessive braking action; and means, responsive to said first timing signal and said analog signal, for modifying said brake control signal to reduce the braking action applied to said braked wheel and thereby initialize said modulator means when said brake control signal crosses a threshold value after remaining within said selected range of values for said selected time period; said selected time period being substantially shorter in duration than the braking period such that the modifying means may operate repeatedly during the braking period to initialize the modulator means.

11. The improvement of claim 10 wherein said analog signal indicative of excessive braking action is the brake control signal and the selected range of values corresponds to substantially no reduction of braking action by the valve means.

12. The improvement of claim 10 wherein said modifying means includes means for abruptly altering said brake control signal in the direction of increased reduction of braking action by said valve means to initialize said modulator means.

13. The apparatus of claim 10 wherein said modifying means includes means for setting said brake control signal to a pre-selected value to initialize said modulator means.

14. The improvement of claim 10 or 11 or 12 or 13 further including means for modifying said reference signal to reduce the magnitude of the input signal when said brake control signal crosses said threshold value after remaining within said selected range for said selected time period, thereby initializing the reference signal.

15. The improvement of claim 14 wherein the means for modifying the reference signal includes means for reducing the magnitude of the reference signal by an amount proportional to the magnitude of the reference signal.

16. The improvement of claim 14 further including:

means for generating a second timer signal for a selected period following modification of said brake control signal by said modifying means; and means, responsive to said second timer signal, for biasing said reference signal in the direction of more aggressive braking during the period when said second timer signal is present.

17. The improvement of claim 16 wherein said reference signal is representative of wheel velocity and wherein said biasing means includes means for biasing the reference signal in the direction of lower velocities.

18. The improvement of claim 16 wherein the means for generating the reference signal includes means for modifying said reference signal in the direction of increased braking action by an amount proportional to a ramp rate, and the biasing means includes means for increasing the magnitude of the ramp rate during the period when the second timer signal is present.

19. The improvement of claim 16 wherein the means for generating the reference signal includes means for updating the reference signal to more nearly equal the wheel signal by an amount which varies according to an update factor and the difference between the reference signal and the wheel signal; and the biasing means includes means for decreasing the magnitude of the update factor during the period when the second timer signal is present.

20. In a vehicle antiskid brake control system for controlling the braking action on a braked wheel during a braking period to slow the vehicle from a higher speed to a lower speed; said system including means for generating a wheel signal indicative of the rotational velocity of said wheel; means for generating a velocity reference signal; means for generating an input signal indicative of the difference between the wheel signal and the reference signal; modulator means for generating a brake control signal as a time integral function of said input signal; and valve means, responsive to said brake control signal, for reducing the braking action applied to said wheel; the improvement comprising:

timer means for generating a first timing signal after said brake control signal has remained for a selected time period within a selected range of values corresponding to substantially no reduction of braking action by said valve means; and means, responsive to said first timing signal and said brake control signal, for modifying said brake control signal to reduce the braking action applied to said braked wheel and thereby initialize said modulator means when said brake control signal crosses a threshold value after remaining within said selected range of values for said selected time period, said modifying means comprising means for setting said brake control signal to a selected value to initialize said modulator means;

said selected time period being shorter in duration than the braking period such that the modifying means may operate repeatedly during the braking period to initialize the modulator means.

21. The improvement of claim 20 further including means for modifying said velocity reference signal to correspond to a lower reference velocity when said brake control signal crosses said threshold value after remaining within said selected range for said selected time period, thereby initializing the reference velocity.

22. The improvement of claim 20 further including:

means for generating a second timer signal for a selected period following modification of said brake control signal by said modifying means; and means, responsive to the second timer signal, for biasing said velocity reference signal towards lower velocities during the period when the second timer signal is present.

23. The improvement of claim 22 wherein the means for generating the velocity reference signal includes means for modifying said velocity reference signal in the direction of reduced reference velocities by an amount proportional to a ramp rate, and the biasing means includes means for increasing the magnitude of the ramp rate during the period when the second timer signal is present.

24. The improvement of claim 22 wherein the means for generating the velocity reference signal includes means for updating the reference signal to more nearly equal the wheel signal by an amount which varies according to an update factor and the difference between the velocity reference signal and the wheel signal; and the biasing means includes means for decreasing the magnitude of the update factor during the period when the second timer signal is present.

25. In an antiskid brake control system including a braked wheel; means for generating a wheel signal indicative of the rotation of said wheel; means for generating a reference signal; means for generating an input signal indicative of the discrepancy between the wheel signal and the reference signal; modulator means for generating a brake control signal as a time integral function of said input signal; and valve means, responsive to said brake control signal, for reducing the braking action applied to said wheel; the improvement comprising:

timer means for generating a first timer signal when an analog signal indicative of excessive braking action crosses a threshold indicative of excessive braking action after having remained for a selected time period within a selected range of values corresponding to an absence of excessive braking action; and means for generating a second timer signal for a selected period following said first timer signal; and means, responsive to said second timer signal, for biasing said reference signal in the direction of more aggressive braking during the period when said second timer signal is present.

26. The improvement of claim 25 wherein said reference signal is representative of wheel velocity and wherein said biasing means includes means for biasing the reference signal in the direction of lower velocities.

27. The improvement of claim 25 wherein the means for generating the reference signal includes means for modifying said reference signal in the direction of increased braking action by an amount proportional to a ramp rate, and the biasing means includes means for increasing the magnitude of the ramp rate during the period when the second timer signal is present.

28. The improvement of claim 25 wherein the means for generating the reference signal includes means for updating the reference signal to more nearly equal the wheel signal by an amount which varies according to an update factor and the difference between the reference signal and the wheel signal; and the biasing means includes means for decreasing the magnitude of the update factor during the period when the second timer signal is present.

29. In an antiskid brake control system including a braked wheel; means for generating a wheel signal indicative of the rotation of said wheel; means for generating a reference signal; means for generating an input signal indicative of the discrepancy between the wheel signal and the reference signal; modulator means for generating a brake control signal as a time integral function of said input signal; and valve means, responsive to said brake control signal, for controlling the braking action applied to said wheel; the improvement comprising:

timer means for generating a first timer signal when an analog indicative of excessive braking action has remained for a selected time period within a selected range of values corresponding to an absence of excessive braking action;

means, responsive to said first timing signal and said analog signal, for modifying said brake control signal to reduce the braking action applied to said braked wheel and thereby initialize said modulator means when said brake control signal crosses a threshold value after remaining within said selected range of values for said selected time period; and means for modifying said reference signal to reduce the magnitude of the input signal when said brake control signal crosses said threshold value after remaining within said selected range for said selected time period, thereby initializing the reference signal.

30. The improvement of claim 29 wherein the means for modifying the reference signal includes means for reducing the magnitude of the reference signal by an amount proportional to the magnitude of the reference signal.

31. The improvement of claim 29 further comprising:
means for generating a second timer signal for a selected period following modification of said brake control signal by said modifying means; and
means, responsive to said second timer signal, for biasing said reference signal in the direction of more aggressive braking during the period when said second timer signal is present.

32. The improvement of claim 31 wherein said reference signal is representative of wheel velocity and wherein said biasing means includes means for biasing the reference signal in the direction of lower velocities.

33. The improvement of claim 31 wherein the means for generating the reference signal includes means for modifying said reference signal in the direction of increased braking action by an amount proportional to a ramp rate, and the biasing means includes means for increasing the magnitude of the ramp rate during the period when the second timer signal is present.

34. The improvement of claim 31 wherein the means for generating the reference signal includes means for updating the reference signal to more nearly equal the wheel signal by an amount which varies according to an update factor and the difference between the reference signal and the wheel signal; and the biasing means includes means for decreasing the magnitude of the update factor during the period when the second timer signal is present.

35. In an antiskid brake control system including a braked wheel; means for generating a wheel signal indicative of the rotational velocity of said wheel; means for generating a velocity reference signal; means for generating an input signal indicative of the difference between the wheel signal and the reference signal; modulator means for generating a brake control signal as a time integral function of said input signal; and valve means, responsive to said brake control signal, for controlling the braking action applied to said wheel; the improvement comprising:
timer means for generating a first timing signal after said brake control signal has remained for a selected time period within a selected range of values corresponding to substantially no reduction of braking action by said valve means;
means, responsive to said first timing signal and said brake control signal, for modifying said brake control signal to reduce the braking action applied to said braked wheel and thereby initialize said modulator means when said brake control signal crosses a threshold value after remaining within said selected range of values for said selected time period; and
means for modifying said velocity reference signal to correspond to a lower reference velocity when said brake control signal crosses said threshold value after remaining within said selected range for said selected time period, thereby initializing the reference velocity.

36. In an antiskid brake control system including a braked wheel; means for generating a wheel signal indicative of the rotational velocity of said wheel; means for generating a velocity reference signal; means for generating an input signal indicative of the difference between the wheel signal and the reference signal; modulator means for generating a brake control signal as a time integral function of said input signal; and valve means, responsive to said brake control signal, for controlling the braking action applied to said wheel; the improvement comprising:
timer means for generating a first timing signal after said brake control signal has remained for a selected time period within a selected range of values corresponding to substantially no reduction of braking action by said valve means;
means, responsive to said first timing signal and said brake control signal, for modifying said brake control signal to reduce the braking action applied to said braked wheel and thereby initialize said modulator means when said brake control signal crosses a threshold value after remaining within said selected range of values for said selected time period;
means for generating a second timer signal for a selected period following modification of said braking control signal by said modifying means; and
means, responsive to the second timer signal, for biasing said velocity reference signal towards lower velocities during the period when the second timer signal is present.

37. The improvement of claim 36 wherein the means for generating the velocity reference signal comprises means for modifying said velocity reference signal in the direction of reduced reference velocities by an amount proportional to a ramp rate, and the biasing means includes means for increasing the magnitude of the ramp rate during the period when the second timer signal is present.

38. The improvement of claim 36 wherein the means for generating the velocity reference signal comprises means for updating the reference signal to more nearly equal the wheel signal by an amount which varies according to an update factor and the difference between the velocity reference signal and the wheel signal; and the biasing means includes means for decreasing the magnitude of the update factor during the period when the second timer signal is present.

* * * * *

UNITED STATES PATENT AND TRADEMARK OFFICE
CERTIFICATE OF CORRECTION

PATENT NO. : 4,338,667
DATED : July 6, 1982
INVENTOR(S) : Robert D. Cook and Thomas Skarvada It is certified that error appears in the above—identified patent and that said Letters Patent is hereby corrected as shown below:

Column 1, line 25, delete "value" and insert therefor --valve--.

Column 16, lines 32 and 33, insert --)-- after the word "BACK" in both instances.

Column 17, line 23, delete "said" and insert therefor --and--.

Column 20, line 53 insert word --signal-- after the word "analog".

Column 22, lines 34 and 35, delete "braking" and insert therefor --brake--.

Signed and Sealed this

Twenty-first Day of December 1982

[SEAL]

Attest:

GERALD J. MOSSINGHOFF

Attesting Officer   Commissioner of Patents and Trademarks